United States Patent
Byl et al.

(10) Patent No.: US 9,996,090 B2
(45) Date of Patent: Jun. 12, 2018

(54) PREPARATION OF HIGH PRESSURE $BF_3/H_2$ MIXTURES

(71) Applicant: Entegris, Inc., Billerica, MA (US)

(72) Inventors: Oleg Byl, Southbury, CT (US); Joseph D. Sweeney, New Milford, CT (US)

(73) Assignee: Entegris, Inc., Billerica, MA (US)

(*) Notice: Subject to any disclaimer, the term of this patent is extended or adjusted under 35 U.S.C. 154(b) by 0 days. days.

(21) Appl. No.: 14/891,352

(22) PCT Filed: May 15, 2014

(86) PCT No.: PCT/US2014/038196
§ 371 (c)(1),
(2) Date: Nov. 15, 2015

(87) PCT Pub. No.: WO2014/186575
PCT Pub. Date: Nov. 20, 2014

(65) Prior Publication Data
US 2016/0085246 A1    Mar. 24, 2016

Related U.S. Application Data

(60) Provisional application No. 61/824,709, filed on May 17, 2013.

(51) Int. Cl.
*F17C 5/06* (2006.01)
*G05D 11/13* (2006.01)
*F25J 3/02* (2006.01)

(52) U.S. Cl.
CPC .......... *G05D 11/133* (2013.01); *F25J 3/0252* (2013.01); *G05D 11/134* (2013.01);
(Continued)

(58) Field of Classification Search
CPC .. G05D 11/133; G05D 11/139; G05D 11/134; G05D 11/135; F25J 3/0252;
(Continued)

(56) References Cited

U.S. PATENT DOCUMENTS 4,262,713 A    4/1981    Egami
4,666,494 A    5/1987    Stritzke et al.
(Continued)

FOREIGN PATENT DOCUMENTS

CN    1854596 A    11/2006
CN    101542186 A    9/2009
(Continued)

OTHER PUBLICATIONS

First Office Action from CN 201480040791, dated Jan. 10, 2017, 9 pages.
(Continued)

*Primary Examiner* — Nicolas A Arnett
(74) *Attorney, Agent, or Firm* — Entegris, Inc.

(57) ABSTRACT

Methods are described for filling gas mixture supply vessels with constituent gases to achieve precision compositions of the gas mixture, wherein the gas mixture comprises at least two constituent gases. Cascading fill techniques may be employed, involving flowing of gases from single source vessels to multiple target vessels, or from multiple source vessels to a single target vessel. The methods may be employed to form dopant gas mixtures, e.g., of boron trifluoride and hydrogen, for ion implantation applications.

17 Claims, 1 Drawing Sheet

(52) U.S. Cl.
CPC ......... *G05D 11/135* (2013.01); *G05D 11/139*
(2013.01); *F17C 2221/03* (2013.01); *F17C
2223/035* (2013.01); *F17C 2225/035*
(2013.01); *F17C 2227/04* (2013.01); *F17C
2270/0518* (2013.01); *Y02E 60/324* (2013.01)

(58) Field of Classification Search
CPC ........ F17C 2270/0518; F17C 2225/035; F17C
2223/035; F17C 2227/04; F17C 2221/03;
Y02E 60/324
See application file for complete search history.

(56) References Cited

U.S. PATENT DOCUMENTS

| | | | |
|---|---|---|---|
| 5,353,848 A | 10/1994 | Gates et al. | |
| 5,409,046 A * | 4/1995 | Swenson | F17C 9/02 141/11 |
| 6,182,713 B1 | 2/2001 | Deck et al. | |
| 6,655,422 B2 * | 12/2003 | Shock | B65B 31/00 141/1 |
| 6,904,944 B2 | 6/2005 | Satou et al. | |
| 7,490,635 B2 | 2/2009 | Klebe et al. | |
| 8,360,112 B2 | 1/2013 | Allidieres et al. | |
| 8,779,383 B2 * | 7/2014 | Mayer | C09K 3/00 250/423 R |
| 9,171,725 B2 * | 10/2015 | Mayer | C09K 3/00 |
| 2003/0070724 A1 * | 4/2003 | Shock | B65B 31/00 141/83 |
| 2004/0118476 A1 | 6/2004 | Borck | |
| 2006/0243207 A1 | 11/2006 | Jursich et al. | |
| 2007/0246121 A1 | 10/2007 | Michel et al. | |
| 2010/0059694 A1 | 3/2010 | Olander et al. | |
| 2010/0224264 A1 | 9/2010 | Homan et al. | |
| 2010/0326537 A1 | 12/2010 | Sarigiannidis | |
| 2012/0227816 A1 | 9/2012 | Song et al. | |
| 2012/0312417 A1 | 12/2012 | De Villemeur | |
| 2013/0264492 A1 * | 10/2013 | Mayer | C09K 3/00 250/428 |
| 2014/0322903 A1 * | 10/2014 | Mayer | C09K 3/00 438/514 |
| 2016/0046849 A1 * | 2/2016 | Mayer | C09K 3/00 252/372 |
| 2016/0305682 A1 * | 10/2016 | Olander | B01D 53/04 |

FOREIGN PATENT DOCUMENTS

| | | |
|---|---|---|
| CN | 102818115 A | 12/2012 |
| DE | 3637925 A1 | 7/1987 |
| EP | 1450097 A2 | 8/2004 |
| JP | S59-201934 | 11/1984 |
| TW | 249271 B | 6/1995 |
| WO | 0038497 A2 | 7/2000 |
| WO | 2014/186575 A1 | 11/2014 |

OTHER PUBLICATIONS

EP Supplementary European Search Report & Written Opinion, from EP 14798140, dated Jan. 4, 2017, 7 pages.

* cited by examiner

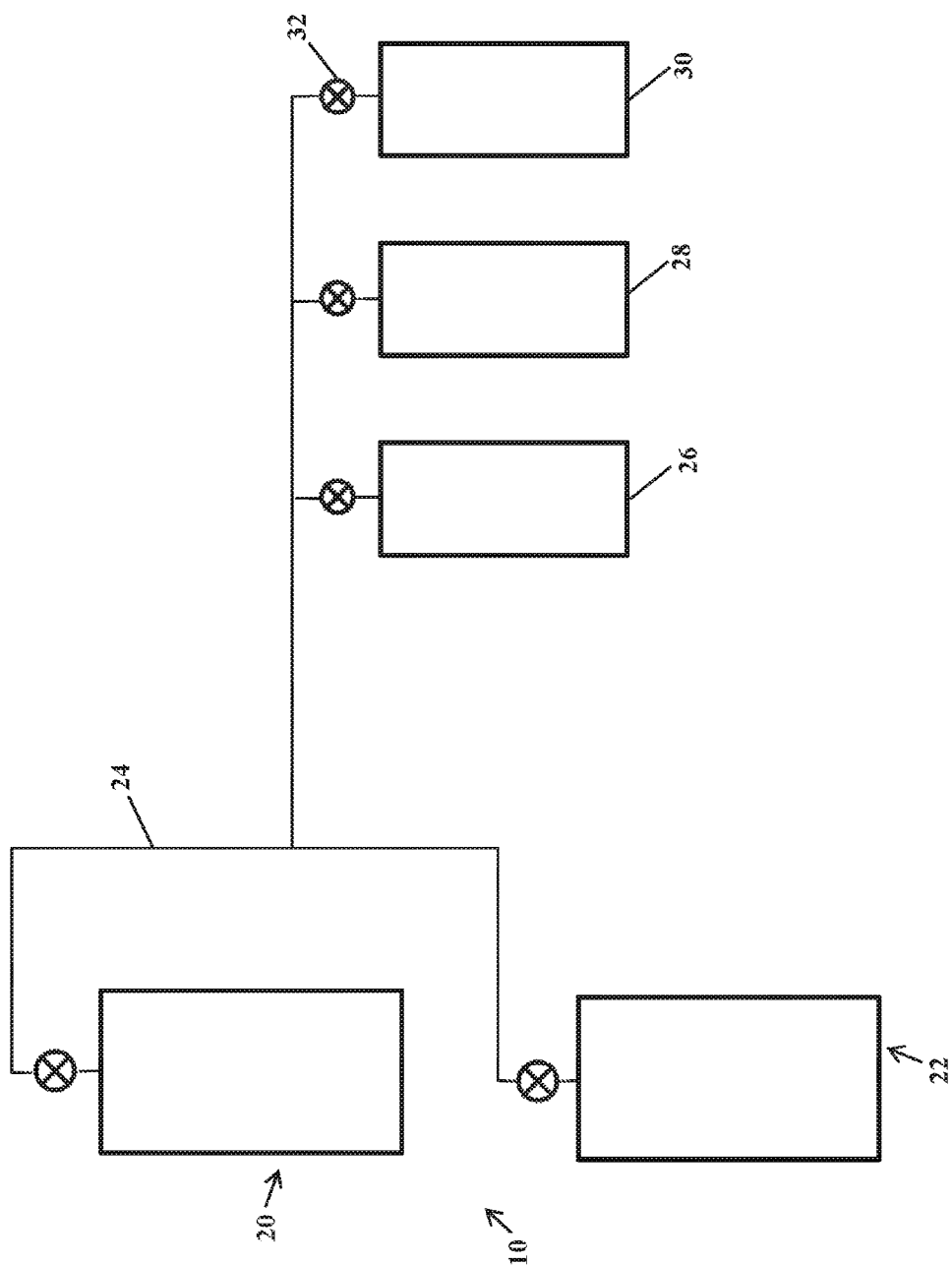

PREPARATION OF HIGH PRESSURE BF$_3$/H$_2$ MIXTURES

CROSS-REFERENCE TO RELATED APPLICATION

This is a U.S. national phase under the provisions of 35 U.S.C. § 371 of International Patent Application No. PCT/US14/38196 filed May 15, 2014, which in turn claims the benefit of priority under 35 USC 119(e) of U.S. Provisional Patent Application 61/824,709 filed May 17, 2013 in the names of Oleg Byl and Joseph D. Sweeney for PREPARATION OF HIGH PRESSURE BF$_3$/H$_2$ MIXTURES. The disclosures of International Patent Application No. PCT/US14/38196 and U.S. Provisional Patent Application 61/824,709 are hereby incorporated herein by reference, in their respective entireties, for all purposes.

FIELD

The present disclosure relates to preparation and packaging of multicomponent gas mixtures for applications in which precise relative proportions and concentrations of the constituent gas components are essential. In a particular aspect, the disclosure relates to preparation of precision mixtures of boron trifluoride and hydrogen.

DESCRIPTION OF THE RELATED ART

In the use of multicomponent gas mixtures, it is necessary in numerous applications to ensure that the amounts of the constituent gas components in the gas mixture are rigorously established at specific concentration values.

For example, this is necessary in the semiconductor manufacturing industry, in which dopant source gas mixtures comprising a dopant source gas and a supplemental gas are supplied to an ionization chamber of an ion implantation tool. In such applications, the maintenance of set point conditions of the dopant source gas is critical to the performance and economics of the implantation operation. The implant tool is arranged for operation at specific process conditions, and variations in set point concentration of the dopant source gas in the gas mixture fed to the ionization chamber can severely adversely affect the implantation process. Such adverse effects can include, without limitation, inadequate ionization, inefficient mass selection of ions for implantation, reduced beam current, excessive deposition in the ionization chamber and beamline components of the implanter apparatus, and shortened operating lifetime of implanter apparatus components such as ionization chamber filaments.

Accordingly, it is necessary to form the gas mixture in the first instance with a high degree of precision, so that the gas mixture constituents are at concentrations that meet essential requirements of the gas utilization processes and apparatus in which such gas mixtures are ultimately used. Achievement of corresponding high levels of accuracy in the preparation of multicomponent gas mixtures therefore is required, but such is frequently difficult to achieve as a result of compressibility of gas mixture components and susceptibility to temperature variations in the fill environment of the vessels to which the separate components of the gas mixture are introduced, which may in turn result in pressure variations in the fill process that frustrate the objective of obtaining precise concentrations of gas constituents in the gas mixture.

In consequence, the art continues to seek improvements in fill processes for achieving high precision multicomponent gas mixtures with precisely controlled concentrations of constituent gases in the mixture.

SUMMARY

The present invention relates to preparation and packaging of multicomponent gas mixtures in a precision-controlled manner meeting rigorous concentration criteria for the associated gases in the multicomponent gas mixture.

In one aspect, the disclosure relates to a method of filling gas mixture supply vessels with constituent gases to achieve precision compositions of the gas mixture, wherein said gas mixture comprises at least two constituent gases, said method comprising:

(A) providing a source vessel of a constituent first gas, and multiple target vessels to be filled with said at least two constituent gases;
(B) flowing the constituent first gas to at least one of the multiple target vessels for a period of time until a predetermined pressure is reached or until pressure stabilizes;
(C) discontinuing flow of the constituent first gas to said at least one of the multiple target vessels, comprising closing said at least one of the multiple target vessels to which constituent first gas has been flowed;
(D) repeating steps (A)-(C) for each of other ones of the multiple target vessels to which constituent first gas has not been introduced;
(E) closing the source vessel; and
(F) optionally repeating steps (A)-(E) with other source vessel(s) until a predetermined target pressure of the constituent first gas is reached in said multiple target vessels, to provide constituent first gas in said multiple target vessels at said predetermined target pressure.

The second and any additional constituent gases then can be introduced into the multiple target vessels to complete the gas mixture preparation and packaging of the gas mixture in the multiple target vessels.

In another aspect, the disclosure relates to a method of filling gas mixture supply vessels with constituent gases to achieve precision compositions of the gas mixture, wherein said gas mixture comprises at least two constituent gases, said method comprising:

(A) providing a first source vessel of a constituent first gas, and multiple target vessels to be filled with said at least two constituent gases;
(B) flowing the constituent first gas from the first source vessel to a first one of the multiple target vessels for a period of time until a predetermined pressure is reached or until pressure stabilizes;
(C) discontinuing flow of the constituent first gas to the first one of the multiple target vessels, comprising closing the first source vessel;
(D) determining pressure in the first target vessel;
(E) if pressure determined in step (D) is less than a predetermined fill pressure, repeating steps (A)-(D) with at least a second source vessel of the constituent first gas, at higher pressure than the first source vessel, until pressure in the first target vessel has reached the predetermined fill pressure;
(F) closing the first target vessel upon reaching the predetermined fill pressure; and
(G) repeating steps (A)-(F) with the others of the multiple target vessels, until all of said multiple target vessels contain the constituent first gas at said predetermined fill pressure.

The second and any additional constituent gases then can be introduced into the multiple target vessels to complete the gas mixture preparation and packaging of the gas mixture in the multiple target vessels.

Other aspects, features and embodiments of the disclosure will be more fully apparent from the ensuing description and appended claims.

BRIEF DESCRIPTION OF THE DRAWINGS

FIG. 1 is a schematic illustration of an example system that includes source vessels, target vessels, and that is useful for methods of this description.

DETAILED DESCRIPTION

The present disclosure relates to the preparation and packaging of multicomponent gas mixtures in which the relative proportions of the gas constituents are precision-controlled to provide set point concentrations of gases in the mixture.

In one aspect, the disclosure relates to a method of filling gas mixture supply vessels with constituent gases to achieve precision compositions of the gas mixture, wherein said gas mixture comprises at least two constituent gases, said method comprising:
(A) providing a source vessel of a constituent first gas, and multiple target vessels to be filled with said at least two constituent gases;
(B) flowing the constituent first gas to at least one of the multiple target vessels for a period of time until a predetermined pressure is reached or until pressure stabilizes (i.e., ceases to vary with time);
(C) discontinuing flow of the constituent first gas to said at least one of the multiple target vessels, comprising closing said at least one of the multiple target vessels to which constituent first gas has been flowed;
(D) repeating steps (A)-(C) for each of other ones of the multiple target vessels to which constituent first gas has not been introduced;
(E) closing the source vessel; and
(F) optionally repeating steps (A)-(E) with other source vessel(s) until a predetermined target pressure of the constituent first gas is reached in said multiple target vessels, to provide constituent first gas in said multiple target vessels at said predetermined target pressure.

The second and any additional constituent gases then can be introduced into the multiple target vessels to complete the gas mixture preparation and packaging of the gas mixture in the multiple target vessels.

In another aspect, the disclosure relates to a method of filling gas mixture supply vessels with constituent gases to achieve precision compositions of the gas mixture, wherein said gas mixture comprises at least two constituent gases, said method comprising:
(A) providing a first source vessel of a constituent first gas, and multiple target vessels to be filled with said at least two constituent gases;
(B) flowing the constituent first gas from the first source vessel to a first one of the multiple target vessels for a period of time until a predetermined pressure is reached or until pressure stabilizes;
(C) discontinuing flow of the constituent first gas to the first one of the multiple target vessels, comprising closing the first source vessel;
(D) determining pressure in the first target vessel;
(E) if pressure determined in step (D) is less than a predetermined fill pressure, repeating steps (A)-(D) with at least a second source vessel of the constituent first gas, at higher pressure than the first source vessel, until pressure in the first target vessel has reached the predetermined fill pressure;
(F) closing the first target vessel upon reaching the predetermined fill pressure; and
(G) repeating steps (A)-(F) with the others of the multiple target vessels, until all of said multiple target vessels contain the constituent first gas at said predetermined fill pressure.

The second and any additional constituent gases then can be introduced into the multiple target vessels to complete the gas mixture preparation and packaging of the gas mixture in the multiple target vessels.

In various embodiments, the above methods may be carried out, in which only one source vessel and one target vessel are in open gas flow communication with one another at any time when the constituent first gas is flowed from a source vessel to a target vessel.

The target vessels may comprise gas cylinders, or other suitable gas mixture storage and dispensing packages.

In the methods of the disclosure, as described above, the constituent first gas can comprise a heaviest gas of the constituent gases in the gas mixture, so that lighter gas is thereafter introduced to the vessel to complete the gas mixture. The above methods may be carried out, in which the source vessel is at higher pressure than the target vessels. Alternatively, such methods may be carried out in which the source vessel is a lower pressure than the target vessels, in which the method comprises pressurizing the constituent first gas to form pressurized constituent first gas for flow to one of the multiple target vessels, wherein such pressurizing is conducted by a pressurization process selected from the group consisting of:
(i) a first pressurization process comprising mechanical gas compression of the constituent first gas;
(ii) a second pressurization process comprising collecting the constituent first gas in an intermediate vessel, cooling the constituent first gas to at least partially condense same, and warming the at least partially condensed constituent first gas to increase pressure thereof;
(iii) a third pressurization process comprising collecting the constituent first gas in an intermediate vessel, and heating the constituent first gas to increase pressure thereof; and
(iv) a fourth pressurization process comprising heating the first source vessel containing the constituent first gas.

In other embodiments, the methods described above may further comprise thermally controlling the target vessels after fill thereof with constituent first gas, for subsequent fill with other(s) of the constituent gases. Such thermally controlling operation may for example comprise placing the target vessels in a temperature controlled environment, e.g., an environment mediated by a thermotron apparatus, or a water bath environment.

In methods of the present disclosure, a characteristic of the constituent first gas in a target vessel can be utilized to determine amount(s) of other(s) of said constituent gases to be introduced to the target vessel to form the gas mixture. The methods may be carried out as comprising weighing the target vessel to determine weight of the constituent first gas as such characteristic.

The foregoing methods in various embodiments further comprise introducing predetermined amount(s) of other(s) of said constituent gases to the target vessel to form the gas mixture. In one embodiment, the target vessel may be maintained at predetermined temperature during introduction of the other(s) of the constituent gases to the target vessel. Such other(s) of the constituent gases may be at predetermined pressure during their introduction to the target vessel. At least one of such other(s) of the constituent gases may be at a predetermined pressure for the gas mixture, so that completion of gas fill in the vessel with the other(s) of the constituent gases provides the gas mixture in the vessel at the predetermined pressure. The gas fill with the other(s) of the constituent gases is conducted with a fill manifold. The fill manifold may comprise a target vessel fill valve to which a target vessel can be coupled for the gas fill. In various embodiments, the gas fill comprises the steps of:
(A) filling the fill manifold up to the target vessel fill valve with one of said other(s) of said constituent gases at the predetermined pressure for the gas mixture; and
(B) opening the target vessel fill valve to flow said one of said other(s) of said constituent gases from the fill manifold into the target vessel to bring it to the predetermined pressure for the gas mixture;
(C) closing the target vessel; and
(D) repeating steps (B) and (C) with other(s) of the target vessels.

The foregoing method may be carried out, further comprising thermally equilibrating the target vessels, determining pressure of the gas mixture therein, and adding at least one of the constituent gases as necessary to reestablish the predetermined pressure for the gas mixture.

FIG. 1 illustrates an example system 10, which includes source vessels, target vessels, related flow conduits and valves, and which can be useful according to methods as described. System 10, includes a first source vessel 20, second source vessel 22, flow conduit 24, target vessels 26, 28, and 30, and valves 32. A system such as example system 10 of FIG. 1

The methods of the present disclosure can further comprise carrying out an analytical technique on the gas mixture in the target vessel to verify its composition, wherein the analytical technique comprises at least one of FTIR analysis, gas chromatography analysis, and gravimetric analysis.

The methods of the present disclosure can be conducted, as further comprising fine tuning the gas mixture composition by at least one of gas addition or gas removal from the target vessel. For example, such methods may comprise cooling the target vessel to condense one or more constituent gases in the gas mixture while maintaining a lighter constituent gas in a gas phase, and removing the gas phase to an extent yielding a predetermined gas mixture composition.

The gas mixtures of the present disclosure can comprise any suitable constituent gases. In various embodiments, the gas mixture comprises boron trifluoride and hydrogen. The gas mixture may comprise at least one ion implantation dopant gas in various embodiments. The disclosure commonplace methods in which the gas mixture contains at least one gas selected from the group consisting of germanium tetrafluoride, germane, boron trifluoride, diborane, diboron tetrafluoride, silicon tetrafluoride, silane, carbon monoxide, carbon dioxide, carbonyl difluoride, arsine, phosphine, hydrogen selenide, hydrogen sulfide, boron trichloride, xenon difluoride, ammonia, argon, neon, xenon, hydrogen, fluorine, oxygen, nitrogen, and helium.

In one aspect, the disclosure contemplates preparation of gas mixtures of boron trifluoride ($BF_3$) and hydrogen ($H_2$) in which multiple source vessels and/or multiple target vessels are utilized for filling target vessels with a first one of such $BF_3$ and $H_2$ gases. In the following illustrative description, $BF_3$ is first filled in the target vessels, followed by hydrogen filling, but the fill sequence of such gases could be reversed, with $H_2$ being filled first, followed by $BF_3$. The vessels utilized in the fill procedure may be of any suitable type, e.g., gas cylinders comprising a cylindrical container equipped with a valve head or other dispensing assembly.

Illustrative Fill Sequence for Filling Target Cylinders with Boron Trifluoride from Source Cylinders In this sequence, the fill process is conducted by allowing $BF_3$ to flow directly from pressurized source cylinders into target cylinders. The target cylinders may be in lots comprising 1 to 12 or more cylinders. In such fill process, the source cylinders should be always at higher pressure than the target cylinders. A cascading technique can be used to achieve more complete material removal from source cylinders.

An exemplary cascading process includes the following steps:
1. Open source cylinder #1 (source-1) and measure initial source pressure P(source-1).
2. Open target cylinder #1 (target-1) and measure initial target pressure P(target-1).
3. Proceed to the next step only if P(Source-1)>P(target-1).
4. Open a valve separating the source and target cylinders to allow $BF_3$ flow for a period of time until a desired pressure is reached or until pressure stabilizes. Record the final pressure.
5. Close the valve separating the source and target cylinders.
6. Close the target-1 cylinder.
7. Repeat steps 2-6 for all target cylinders in the lot.
8. Close source-1.
9. Repeat steps 1-8 for another source cylinder, if needed, until desired target cylinder pressures are reached.

The above process employs cascade filling in which the first gas is cascade filled from a single source cylinder to multiple target cylinders.

Alternatively, the gas could be cascade filled from multiple source cylinders into a single target cylinder, e.g., by a process comprising the following sequence of steps:
1. Open target cylinder #1 (target-1) and measure the initial target pressure P(target-1).
2. Open source cylinder #1 (source-1) and measure the initial source pressure P(source-1).
3. Proceed to the next step only if P(Source-1)>P(target-1).
4. Open a valve separating the source and target cylinders to allow $BF_3$ flow for a period of time until a desired pressure is reached or until pressure stabilizes. Record final pressure.
5. Close the source-1 cylinder.
6. If the target cylinder pressure is still less than desired final fill pressure, repeat the prior steps using source cylinder #2 (which has a higher pressure than source cylinder #1). This can be repeated with another (one or more) source cylinders until the target cylinder pressure has reached the desired value.
7. Close the target-1 cylinder upon reaching final fill pressure.
8. Repeat steps 1-7 for the rest of the target cylinders.

The above two methods describe filling processes in which at any time when gas is flowed, only one source cylinder and one target cylinder are open in fluid flow communication with one another.

In the case in which the source cylinders are at lower pressure than the target cylinders, the corresponding gas could be filled indirectly into the target cylinders by any of the following methods:
(i) utilizing a motorized gas compressor to pressurize the gas so that it can flowed to the target vessel(s); or
(ii) the gas could be captured in a cooled intermediate small volume vessel to enable the gas to be condensed, so that such intermediate vessel can thereafter be warmed to raise the pressure of the gas in relation to the target vessel(s), to enable fill of the target vessel(s) with gas from the warmed intermediate vessel; or
(iii) an intermediate vessel between the source and target vessels can be filled with the gas and the intermediate vessel thereafter can be heated to increase the gas pressure above the pressure of the target vessel(s), so that the target vessel(s) can be filled with gas from the intermediate vessel; or
(iv) heating of the source vessel(s).

As or after the first gas is filled in the target vessel, the vessel can be maintained at predetermined temperature at which the precise amount of first gas is determined or determinable. For example, to achieve a $BF_3/H_2$ mixture in which hydrogen concentration is 5% by volume, a specifically selected $BF_3$ pressure may be provided in the target vessel, with the vessel being maintained at a specific temperature, e.g., a temperature of 22.0° C., to accommodate the subsequent fill of hydrogen. This may be carried out with the target vessel being precisely controlled at the predetermined temperature of 22.0° C. in any suitable manner, such as by placing the target vessel in a temperature controlled environment, e.g., a thermotron apparatus or a water bath that is optionally equipped with a circulator to enable the water to be maintained at isothermal conditions.

Alternatively, the temperature of the target vessel(s) could be monitored (while either being under active pressure control or not), and using an appropriate equation of state relationship (e.g., Redlich-Kwong or Peng-Robinson), or by using empirically derived data relating pressure, density, and temperature, the fill process could proceed until an appropriate pressure is reached given the vessel temperature that is measured. The appropriate pressure would be such as to correlate to the desired mass of gas to be placed in the vessel.

The thermally stabilized vessel subsequent to fill with the first gas to a specific pressure then is ready to be filled with the second (and any additional) gas(es). The temperature and pressure conditions of the first gas together with the known volume of the target vessel can be employed to determine the total pressure upon addition of the second gas that must be reached to achieve the final amounts and relative proportions of the constituent gases.

It is often assumed that a mixture of gases obeys the Dalton's law and total pressure is a sum of partial pressures of individual gases. It is known that substantial deviations can occur at high pressures but often little is known about specifics of pressure change at or shortly after the moment of mixing. In the case of $BF_3/H_2$ mixture, addition of $H_2$ to $BF_3$ under elevated pressure results in pressure increase that is also impacted by temporal effects of gas mixing. During $H_2$ addition, temperature increases and its magnitude is proportional to the flow rate. The mixture starts to cool when the flow is stopped, and this phenomenon contributes first to pressure increase and then to pressure drop. Another phenomenon related to gas mixing manifests itself. When $H_2$ is introduced, it compresses $BF_3$, resulting in reduction of $BF_3$ compressibility factor leading to reduction in $BF_3$ partial and the resulting total pressures. At the same time $BF_3$ and $H_2$ start to mix which increases compressibility factor of the mixture that contributes to total pressure increase until it reaches a steady value for fully mixed gases. All of these phenomena result in a complex pressure vs. temperature profile that exhibits an oscillatory behavior upon completion of $H_2$ introduction and complicates detection of the final mixture pressure. An easy solution to this problem is to allow the gases to mix completely under isothermal conditions, and add more $H_2$ as needed if the target pressure has not been reached. However, this solution may require substantial time and can make the whole process inefficient and expensive. Understanding of these phenomena enables empirical pressure-temperature-time matrixes to be developed that are capable of providing a transient target pressure for $H_2$ addition that corresponds to precise relative proportions of the constituent gases.

Accordingly, the present disclosure contemplates a methodology of constructing empirical P/T/t (pressure/temperature/time) matrices for determination of transient target gas pressure for gas addition, to achieve precision gas mixtures.

Additionally, or alternatively, upon filling of the target vessel with the first gas, the target vessel could be weighed to determine the amount (e.g., net weight) of the first gas in the vessel, to enable the concentration calculation for the second gas (or subsequent gas(es), if the gas mixture comprises three or more constituents). For the illustrative $BF_3/H_2$ mixture, the target cylinder could be weighed upon filling with $BF_3$ to determine its net weight for $H_2$ concentration calculation.

Illustrative Fill Sequence for Filling Target Cylinders with Hydrogen after Boron Trifluoride Fill In this illustrative process, the $H_2$ is added to achieve a gas mixture pressure of 1090 psia at temperature of 21.5° C. It will be recognized that the order of the components may be reversed, with $H_2$ being filled first, followed by fill of the vessel with $BF_3$ to form the $BF_3/H_2$ mixture. In such reverse order fill sequence, with $H_2$ being filled first, followed by fill of the vessel with $BF_3$, the $H_2$ pressure should be determined first, to determine the amount of $BF_3$ that should be added to complete the gas mixture (the final mixture pressure would still be 1090 psia at 21.5° C. in this reverse example).

In the sequence in which the boron trifluoride has been filled in the target vessel, the hydrogen fill may be carried out as follows.

After re-installing the $BF_3$-filled target cylinders on the manifold, $H_2$ is added to the cylinders to 1090 psia at temperature of 21.5° C. As in the case of the $BF_3$ fill, the cylinder temperature can be precisely controlled for achieving target $H_2$ concentration precision and accuracy; alternatively, the cylinder temperature can be monitored and then fill pressure can be corrected using empirical equation of state data, or known models, as described hereinabove. The $H_2$ fill in an exemplary process includes the following steps:
1. Place the target cylinders in a temperature-controlled environment to stabilize cylinder temperature at a predetermined set point temperature level.
2. Set $H_2$ pressure for the fill process to 1090 psia.
3. Fill manifold lines with $H_2$ to 1090 psia, allowing the $H_2$ to stay in the manifold flow circuitry for a predetermined period of time, e.g., 5-10 minutes, and then evacuate the manifold lines.
4. Fill the manifold flow circuitry up to target cylinder fill valves to the selected pressure of 1090 psia.
5. Open the target cylinder (target-1) briefly to fill it to a pressure of 1090 psia and then close the target cylinder. The hydrogen fills may need to be conducted in a cascade fashion, if the source hydrogen cylinder pressure is less than 1090 psia.
6. Repeat step 5 sequentially for all target cylinders.
7. Allow the target cylinders to return to the set point temperature.
8. Verify the pressure of the target cylinder (target-1) and if necessary add more $H_2$ to reach the target pressure of 1090 psia.

Regardless of the specific details of the particular example presented here, it will be more generally recognized that such methodology would be useful for filling target vessels to any number of mixture composition targets.

As a further variation, $H_2$ fill could be carried out to simultaneously fill more than one cylinder. In the same way, the $BF_3$ fill could be carried out to simultaneously fill more than one target vessel. It is also contemplated that more than one source vessel could be opened simultaneously to the one or more target vessels that are opened. Nonetheless, having a single target vessel opened to a single source vessel will constitute a preferred methodology in various implementations of the present disclosure.

Analysis can then be carried out to determine hydrogen concentration and verify the composition of the gas mixture. For example, upon adding hydrogen in the above-described fill sequence, the target cylinders can be weighed to determine $H_2$ net weight and calculate $H_2$ concentration. Other analytical methods can be employed for determining $H_2$ net weight and to calculate $H_2$ concentration, such as Fourier Transform Infrared (FTIR) analysis, gas chromatography analysis, etc. In various embodiments, the analytic technique comprises gravimetric determinations, since unlike other methods, reliable standards (NIST traceable weights) are readily available. Care must be taken in ensuring accuracy of gravimetric methods, however, due to the low molecular weight of $H_2$.

Another approach to preparing vessels of precise concentration gas mixtures is to provide gas mixture in large volume cylinders, e.g., volumes of 49 to 500 liters, as "mother cylinders" for filling of target cylinders, e.g., of 5 to 50 liter volume. The mother cylinder may be filled with gas mixture, hydrogen concentration is calculated, and the $BF_3/H_2$ mixture is then filled from the mother cylinder into the target cylinders. Cascading techniques can be used in such mixture fill of the target cylinders, to achieve more complete material utilization.

End points in the mother cylinder fill procedure can be determined by filling the target cylinders to a predetermined pressure, or by monitoring the mother cylinder pressure, or by monitoring weight change of the mother cylinder or target cylinder and terminating the fill operation when a desired weight of gas mixture has been transferred. In order to assure homogeneity of the gas mixture in the fill operation, particularly when filling large target cylinders, filling may be accompanied by rotation of the target cylinders about their longitudinal axes. Such rotation will accelerate the gas mixing operation, in which the second gas (and subsequent gases if involved) will be assisted in dispersing into the first gas, to form the gas mixture. Other techniques, such as the use of down tubes terminating at their lower ends in flow spreaders, may be employed, to effect intermixing of gas introduced to the target cylinder with gas already present therein.

Although the thermal modulation of the target vessel to achieve set point pressure of introduced gas to achieve a precise amount of such gas in the vessel can be carried out with good effect, circumstances may exist in which further fine-tuning is necessary after the gas mixture has been formed, to rigorously achieve highly accurate concentrations of the respective gases in the multicomponent gas mixture. In such circumstances, it may be necessary to change the concentration of one or more of the gases in the mixture.

For example, in the case of a $BF_3/H_2$ gas mixture, the hydrogen concentration of the mixture may need to be modified subsequent to completion of the fill operation. This may be achieved by concentration modulation of the mixture present in the vessel.

For example, when a lower molecular weight, lighter gas is present in slight excess over a desired set point concentration, the gas mixture composition can be modulated by cooling the target vessel containing the mixture to condense one or more of the constituent heavier gases, while maintaining the lighter constituent gas in the gas phase. Gas phase material then can be removed from the vessel, to adjust the relative proportions of the various mixture components to a desired value. The removal operation can be monitored by in-situ monitoring techniques to determine the concentration of either the gas volume in the vessel, and/or the concentration in the removed gasphase material, to identify the point at which a desired concentration of gases in the gas mixture has been achieved in the vessel.

Alternatively, precise amounts of one or more of the gas components of the mixture could be added to the vessel containing the gas mixture, to fine tune the concentration to a desired set point value for the gas components of the mixture. Such gas addition may be accompanied by removal of a small amount of the gas mixture, to prevent overfilling of the vessel during the fine tune adjustment of concentration.

It will be recognized that the gas mixture preparation packaging methods of the present disclosure may be utilized with any of numerous gases to produce high precision gas mixtures for subsequent use. While the disclosure has been exemplified and illustrated with respect to boron trifluoride/hydrogen gas mixtures, it will be recognized that the disclosure is not thus limited, and extends to and includes any other suitable gas mixtures in which close control of concentrations of constituent gases are necessary for subsequent utilization of the gas mixture.

It will be further recognized that the methods of the present disclosure can be carried out utilizing a source cylinder containing a premixed gas composition that then is subsequently processed to achieve the high precision concentration of component gases in the mixture, i.e., wherein the method is conducted to yield a predetermined gas mixture composition therefrom.

It will also be recognized that the methods of the present disclosure can be automated, as discussed hereafter, utilizing suitable monitoring and control systems, to effect automated operation of at least one step of such methods.

Illustrative other gas mixtures to which the methods of the present disclosure may be applied, include gas mixtures containing one or more dopant gases for use in ion implantation, such as germanium tetrafluoride, germane, boron trifluoride, diborane, diboron tetrafluoride, silicon tetrafluoride, silane, carbon monoxide, carbon dioxide, carbonyl difluoride, arsine, phosphine, hydrogen selenide, hydrogen sulfide, boron trichloride, xenon difluoride, and ammonia, with one or more supplemental gases such as argon, neon, xenon, hydrogen, fluorine, oxygen, nitrogen, and helium.

The disclosure further contemplates implementations of the present methodology in an automated fill process using appropriate controls hardware and software. For example, an appropriate orifice or flow controller device can be placed in line to restrict/control the flow rate of the source gas constituents to the target cylinder(s). A control algorithm can be utilized such that one or more measurements of the target or source cylinders (e.g., weight, pressure, temperature, etc.) could be used to monitor the fill process. Upon reaching a predetermined endpoint, the control system can be programmatically arranged to close the fill valve or valves. If cooling of the target cylinders is typical for a particular fill operation, the control system can be programmed to wait until the temperature drops by a predetermined amount (or to wait for a predetermined period of time), and then the target cylinders can be topped off in order to achieve the ultimate pressure for the fill operation.

The automated control system could also ensure that only the desired number of source and target cylinders is opened simultaneously. For example, this could be done as described hereinabove, by a methodology in which the software would automatically open and close the appropriate valve so that the entire fill process could be automated.

In another implementation, a high-pressure regulator could be utilized on the source gas, in which the delivery pressure of the regulator is set to an appropriate value in accordance with a predetermined fill pressure of the target cylinders. The regulator would continue to facilitate filling the target cylinders as they slowly cool after the initial heating due to the fill.

While the disclosure has been set out herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the invention as hereinafter claimed is intended to be broadly construed and interpreted, as including all such variations, modifications and alternative embodiments, within its spirit and scope.

What is claimed is:

1. A method of filling gas mixture supply vessels with constituent gases to achieve precision compositions of the gas mixture, wherein said gas mixture comprises at least two constituent gases, said method comprising:
   (A) providing a source vessel of a constituent first gas comprising dopant gas, and multiple target vessels to be filled with said at least two constituent gases;
   (B) flowing the constituent first gas to at least one of the multiple target vessels for a period of time until a predetermined pressure is reached or until pressure stabilizes;
   (C) discontinuing flow of the constituent first gas to said at least one of the multiple target vessels, comprising closing said at least one of the multiple target vessels to which constituent first gas has been flowed;
   (D) repeating steps (A)-(C) for each of other ones of the multiple target vessels to which constituent first gas has not been introduced;
   (E) closing the source vessel;
   (F) optionally repeating steps (A)-(E) with one or more other source vessels of the constituent first gas until a predetermined target pressure of the constituent first gas is reached in said multiple target vessels, to provide constituent first gas in said multiple target vessels at said predetermined target pressure; and
   (G) introducing a constituent second gas to each of the target vessels to form said gas mixture, the constituent second gas comprising a supplemental gas that is not a dopant gas, the constituent second gas being added to achieve a total transient pressure that corresponds to known relative proportions of the constituent gases,
wherein the constituent first gas comprises a heaviest gas of the constituent gases in the gas mixture.

2. The method according to claim 1, wherein only one source vessel and one target vessel are in open gas flow communication with one another at any time when the constituent first gas is flowed from a source vessel to a target vessel.

3. The method according to claim 1, wherein the target vessels comprise gas cylinders.

4. The method according to claim 1, wherein the source vessel is at higher pressure than the target vessels.

5. The method according to claim 1, wherein the source vessel is at lower pressure than the target vessels, further comprising pressurizing the constituent first gas to form pressurized constituent first gas for flow to one of the multiple target vessels, wherein said pressurizing is conducted by a pressurization process selected from the group consisting of:
   (i) a first pressurization process comprising mechanical gas compression of the constituent first gas;
   (ii) a second pressurization process comprising collecting the constituent first gas in an intermediate vessel, cooling the constituent first gas to at least partially condense same, and warming the at least partially condensed constituent first gas to increase pressure thereof;
   (iii) a third pressurization process comprising collecting the constituent first gas in an intermediate vessel, and heating the constituent first gas to increase pressure thereof; and
   (iv) a fourth pressurization process comprising heating the first source vessel containing the constituent first gas.

6. The method according to claim 1, further comprising thermally controlling said target vessels after fill thereof with constituent first gas, for subsequent fill with other(s) of said constituent gases.

7. The method according to claim 6, further comprising maintaining the target vessel at predetermined temperature during introduction of said other(s) of said constituent gases to the target vessel.

8. The method according to claim 7, wherein said other(s) of said constituent gases is/are at predetermined pressure during their introduction to the target vessel.

9. The method of claim 8, wherein at least one of said other(s) of said constituent gases is at a predetermined pressure for the gas mixture, so that completion of gas fill of the vessel with said other(s) of said constituent gases provides the gas mixture in said vessel at said predetermined pressure.

10. The method according to claim 1, wherein the gas mixture comprises boron trifluoride and hydrogen.

11. The method according to claim 1, wherein the dopant gas is selected from the group consisting of germanium tetrafluoride, germane, boron trifluoride, diborane, diboron tetrafluoride, silicon tetrafluoride, silane, carbonyl difluoride, arsine, hydrogen selenide, hydrogen sulfide, phosphine, boron trichloride, and xenon difluoride.

12. The method according to claim 1, wherein a source vessel contains a pre-mixed gas composition, and the method is conducted to yield a predetermined gas mixture composition therefrom.

13. The method according to claim 1, comprising automated operation of at least one step of the method.

14. The method of claim 1 wherein the constituent second gas is a supplemental gas selected from argon, neon, xenon, hydrogen, fluorine, oxygen, nitrogen, and helium.

15. The method of claim 1 wherein the dopant gas is selected from germanium tetrafluoride, boron trifluoride, and silicon tetrafluoride.

16. The method of claim 15 wherein the constituent second gas is hydrogen.

17. The method of claim 1 wherein the total pressure upon addition of the constituent second gas is determined empirically.

* * * * *